United States Patent
Takeuchi et al.

(10) Patent No.: US 6,466,894 B2
(45) Date of Patent: *Oct. 15, 2002

(54) DEVICE, METHOD, AND MEDIUM FOR PREDICTING A PROBABILITY OF AN OCCURRENCE OF A DATA

(75) Inventors: Jun-Ichi Takeuchi, Tokyo (JP); Andrew R. Barron, New Haven, CT (US)

(73) Assignees: NEC Corporation, Tokyo (JP); Yale University, New Haven, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/099,405

(22) Filed: Jun. 18, 1998

(65) Prior Publication Data

US 2002/0111769 A1 Aug. 15, 2002

(51) Int. Cl.[7] ............................................... G01V 1/40
(52) U.S. Cl. ........................ 702/181; 702/179; 702/198
(58) Field of Search ................... 702/179, 181, 702/198; 700/91, 93; 341/50, 107

(56) References Cited

U.S. PATENT DOCUMENTS

| | | | | |
|---|---|---|---|---|
| 5,072,452 A | * | 12/1991 | Brown et al. ................. | 381/43 |
| 5,113,367 A | * | 5/1992 | Marrian et al. ............. | 364/819 |
| 5,539,704 A | * | 7/1996 | Doyen et al. ................. | 367/73 |
| 5,659,771 A | * | 8/1997 | Golding ....................... | 395/795 |
| 5,859,891 A | * | 1/1999 | Hibbard ....................... | 378/62 |
| 5,909,190 A | * | 6/1999 | Lo et al. ...................... | 342/159 |
| 5,956,702 A | * | 9/1999 | Matuoka et al. ............. | 706/22 |
| 6,009,452 A | * | 12/1999 | Horvits ......................... | 709/102 |
| 6,067,484 A | * | 5/2000 | Rowson et al. ................ | 701/16 |
| 6,076,083 A | * | 6/2000 | Baker ............................ | 706/52 |
| 6,095,982 A | * | 8/2000 | Richards-Kortum et al. ...... | 600/476 |
| 6,155,704 A | * | 12/2000 | Hunt et al. ................... | 364/525 |
| 6,161,209 A | * | 12/2000 | Moher ......................... | 714/780 |

OTHER PUBLICATIONS

John C. Chao, "Jeffreys Prior Analysis of the Simultaneous Equations Model in the Cases with n + 1 Endogeneous Variables" (Jul. 1998).*
Frank Kleibergen Richard Kleijn, "Bayesian Testing in Cointegration Models using the Jeffreys' Prior".*
Csiszar Budapest, "Information Theoretic Methods in Probability and Statistics".*
G. Larry Bretthorst, "An Introduction to Parameter Estimation Using Bayesian Probability Theory".*
Te Sun Han and Kingo Kobayashi, "Mathematics of Information and Coding, Translations of Mathematical Monographs", vol. 203, American Mathematical Society 2002.
J. Rissanen, "Universal Modeling and Coding" IEEE trans. Information Theory, vol. 27, No. 1, pp. 12–23, 1981.

* cited by examiner

Primary Examiner—Marc S. Hoff
Assistant Examiner—Carol S Tsai
(74) Attorney, Agent, or Firm—Sughrue Mion, PLLC

(57) ABSTRACT

In a Bayes mixture probability density calculator for calculating Bayes mixture probability density which reduces a logarithmic loss A modified Bayes mixture probability density is calculated by mixing raditional Bayes mixture probability density calculated on given model S with a small pary of Bayes mixture probability density for exponential fiber bundle on the S. Likewise, a prediction probability calculator is configured by including the Bayes mixture probability density calculator, and by using Jeffredys prior distribution in traditional Bayes procedure on the S.

12 Claims, 3 Drawing Sheets

DEVICE, METHOD, AND MEDIUM FOR PREDICTING A PROBABILITY OF AN OCCURRENCE OF A DATA

BACKGROUND OF THE INVENTION

This invention relates to technology for statistical prediction and, in particular, to technology for prediction based on Bayes procedure.

Conventionally, a wide variety of methods have been proposed to statistically predict a data on the basis of a sequence of data generated from the unknown source. Among the methods, Bayes prediction procedure has been widely known and has been described or explained in various textbooks concerned with statistics and so forth.

As a problem to be solved by such statistical prediction, there is a problem for sequentially predicting, by use of an estimation result, next data which appear after the data sequence. As regards this problem, proof has been made about the fact that a specific Bayes procedure exhibits a very good minimax property by using a particular prior distribution which may be referred to as Jeffreys prior distribution. Such a specific Bayes procedure will be called Jeffreys procedure hereinafter. This proof is done by B. Clarke and A. R. Barron in an article which is published in Journal of Statistical Planning and Inference, 41:37–60, 1994, and which is entitled "Jeffreys prior is asymptotically least favorable under entropy risk". This procedure is guaranteed to be always optimum whenever a probability distribution hypothesis class is assumed to be a general smooth model class, although some mathematical restrictions are required in strict sense.

Herein, let logarithmic regret be used as another index. In this event also, it is again proved that the Jeffery procedure has a minimax property on the assumption that a probability distribution hypothesis class belongs to an exponential family. This proof is made by J. Takeuchi and A. R. Barron in a paper entitled "Asymptotically minimax regret for exponential families", in Proceedings of 20th Symposium on Information Theory and Its Applications, pp. 665–668, 1997.

Furthermore, the problem of the sequential prediction can be replaced by a problem which provides a joint (or simultaneous) probability distribution of a data sequence obtained by cumulatively multiplying prediction probability distributions.

These proofs suggest that the Jeffreys procedure can have excellent performance except that the prediction problem is sequential, when the performance measure is the logarithmic loss.

Thus, it has been proved by Clarke and Barron and by Takeuchi and Barron that the Bayes procedure is effective when the Jeffreys prior distribution is used. However, the Bayes procedure is effective only when the model class of the probability distribution is restricted to the exponential family which is very unique, in the case where the performance measure is the logarithmic regret instead of redundancy.

Under the circumstances, it is assumed that the probability distribution model class belongs to a general smooth model class which is different from the exponential family. In this case, the Jeffreys procedure described in above B. Clarke and A. R Barron's document does not guarantee the minimax property. To the contrary, it is confirmed by the instant inventors in this case that the Jeffreys procedure does not have the minimax property.

Furthermore, it often happens that a similar reduction of performance takes place in a general Bayes procedure different from the Jeffreys procedure when estimation is made by using the logarithmic regret in lieu of the redundancy.

SUMMARY OF THE INVENTION

It is an object of this invention to provide a method which is capable of preventing a reduction of performance.

It is a specific object of this invention to provide improved Jeffreys procedure which can accomplish a minimax property even when logarithmic regret is used a performance measure instead of redundancy.

According to a first embodiment of the invention, a Bayes mixture density calculator operable in response to a sequence of vectors $x^n = (x_1, x_2, \ldots, x_n)$ selected from a vector value set $\chi$ to produce a Bayes mixture density on occurrence of the $x^n$, comprising a probability density calculator, supplied with a sequence of data $x^t$ and a vector value parameter u, for calculating a probability density, for the $x^t$, $p(x^t|u)$, a Bayes mixture calculator for calculating a first approximation value of a Bayes mixture density $p_w(x^n)$ on the basis of a prior distribution $w(u)$ predetermined by the probability density calculator to produce the first approximation value, an enlarged mixture calculator for calculating a second approximation value of a Bayes mixture $m(x^n)$ on exponential fiber bundle in cooperation with the probability density calculator to produce the second approximation value, and a whole mixture calculator for calculating $(1-\epsilon) p_w(x^n) + \epsilon \cdot m(x^n)$ to produce a calculation result by mixing the first approximation value of the Bayes mixture density $p_w(x^n)$ with a part of the second approximation value of the Bayes mixture $m(x^n)$ at a rate of $1-\epsilon:\epsilon$ to produce the calculation result where $\epsilon$ is a value smaller than unity.

According to a second embodiment of the invention which can be modified based on the first embodiment of the invention, a Jeffreys mixture density calculator operable in response to a sequence of vector $x^n = (x_1, x_2, \ldots, x_n)$ selected from a vector value set $\chi$ to produce a Bayes mixture density on occurrence of the $x^n$, comprising a probability density calculator responsive to a sequence of data $x^t$ and a vector value parameter u for calculating a probability density $p(x^t|u)$ for the $x^t$, a Jeffreys mixture calculator for calculating a first approximation value of a Bayes mixture density $p_J(x^n)$ based on a Jeffreys prior distribution $w_J(u)$ in cooperation with the probability density calculator to produce the first approximation value, an enlarged mixture calculator for calculating a second approximation value of a Bayes mixture $m(x^n)$ on exponential fiber bundle in cooperation with the probability density calculator to produce the second approximation value, and a whole mixture calculator for calculating $(1-\epsilon) p_J(x^n) + \epsilon \cdot m(x^n)$ to produce a calculation result by mixing the first approximation value of the Bayes mixture density $p_J(x^n)$ with a part of the second approximation value of the Bayes mixture $m(x^n)$ at a rate of $1-\epsilon:\epsilon$ to produce the calculation result where $\epsilon$ is a value smaller than unity.

Also, when hypothesis class is curved exponential family, it is possible to provide with a third embodiment of the invention by modifying the first embodiment of the invention. According to the third embodiment of the invention, a Bayes mixture density calculator operable in response to a sequence of vector $x^n = (x_1, x_2, \ldots, x_n)$ selected from a vector value set $\chi$ to produce a Bayes mixture density on occurrence of the $x^n$, comprising a probability density calculator responsive to a sequence of data $x^t$ and a vector value parameter u for outputting probability density $p(x^t|u)$ for the $x^t$ on curved exponential family, a Bayes mixture calculator for calculating a first approximation value of a Bayes mixture density $p_w(x^n)$ on the basis of a prior distribution $w(u)$ predetermined by the probability density calculator to produce the first approximation value, an enlarged mixture calculator for calculating a second approximation value of a Bayes mixture $m(x^n)$ on exponential family including curved exponential family in cooperation with the probability density calculator to produce the second approximation value, and a whole mixture calculator for calculating $(1-\epsilon) p_w(x^n)+\epsilon \cdot m(x^n)$ to produce a calculation result by mixing the first approximation value of the Bayes mixture density $p_w(x^n)$ with a part of the second approximation value of the Bayes mixture $m(x^n)$ at a rate of $1-\epsilon:\epsilon$ to produce the calculation result where $\epsilon$ is a value smaller than unity.

According to a forth embodiment of the invention which can be modified based on the third embodiment of the invention, a Jeffreys mixture density calculator operable in response to a sequence of vector $x^n=(x_1, x_2, \ldots, x_n)$ selected from a vector value set $\chi$ to produce a Bayes mixture density on occurrence of the $x^n$, comprising a probability density calculator responsive to a sequence of data $x^t$ and a vector value parameter u for calculating probability density $p(x^t|u)$ for the $x^t$ on curved exponential family, a Jeffreys mixture calculator for calculating a first approximation value of a Bayes mixture density $p_J(x^n)$ based on a Jeffreys prior distribution $w_J(u)$ in cooperation with the probability density calculator to produce the first approximation value, an enlarged mixture calculator for calculating a second approximation value of a Bayes mixture $m(x^n)$ on exponential family including curved exponential family in cooperation with the probability density calculator to produce the second approximation value, and a whole mixture calculator for calculating $(1-\epsilon) p_J(x^n)+\epsilon \cdot m(x^n)$ to produce a calculation result by mixing the first approximation value of the Bayes mixture density $p_J(x^n)$ with a part of the second approximation value of the Bayes mixture $m(x^n)$ at a ratio of $1-\epsilon:\epsilon$ to produce the calculation result where $\epsilon$ is a value smaller than unity.

According to a fifth embodiment of the invention, a predictions probability density calculator operable in response to a sequence of vector $x^n=(x_1, x_2, \ldots, x_n)$ selected from a vector value set $\chi$ and $x_{n+1}$ to produce a prediction probability density on occurrence of the $x_{n+1}$, comprising a joint probability calculator structured by the Bayes mixture density calculator claimed in claim 1 for calculating a modified Bayes mixture density $q^{(\epsilon)}(x^n)$ and $q^{(\epsilon)}(x^{n+1})$ based on predetermined prior distribution to produce first calculation results and a divider responsive to the calculation results for calculating probability density $q^{(\epsilon)}(x^{n+1})/q^{(\epsilon)}(x^n)$ to produce a second calculation result with the first calculation results kept intact.

According to a sixth embodiment of the invention which can be modified based on the fifth embodiment of the invention, a prediction probability density calculator operable in response to a sequence of vector $x^n=(x_1, x_2, \ldots, x_n)$ selected from a vector value set $\chi$ and $x_{n+1}$ to produce a prediction probability density on occurrence of the $x_{n+1}$, comprising a joint probability calculator structured by the Jeffreys mixture density calculator claimed in claim 2 for calculating a modified Jeffreys mixture density $q^{(\epsilon)}(x^n)$ and $q^{(\epsilon)}(x^{n+1})$ to produce first calculation results and a divider response to the calculation results for calculating a probability density $q^{(\epsilon)}(x^{n+1})/q^{(\epsilon)}(x^n)$ to produce a second calculation result with the first calculation results kept intact.

Also, when hypothesis class is curved exponential family, it is possible to provide with a seventh embodiment of the invention by modifying the fifth embodiment of the invention. According the seventh embodiment of the invention, a prediction probability density calculator operable in response to a sequence of vector $x^n=(x_1, x_2, \ldots, x_n)$ selected from a vector value set $\chi$ and $x_{n+1}$ to produce a prediction probability density on occurrence of the $x_{n+1}$, comprising a joint probability calculator structured by the Bayes mixture density calculator claimed in claim 3 for calculating a modified Bayes mixture density $q^{(\epsilon)}(x^n)$ and $q^{(\epsilon)}(x^{n+1})$ based on a predetermined prior distribution to produce first calculation results and a divider responsive to the calculation results for calculating a probability density $q^{(\epsilon)}(x^{n+1})/q^{(\epsilon)}(x^n)$ to produce a second calculation result with the first calculation results kept intact.

According to an eighth embodiment of the invention which can be modified based on the seventh embodiment of the invention, a prediction probability density calculator operable in response to a sequence of vector $x^n=(x_1, x_2, \ldots, x_n)$ selected from a vector value set $\chi$ and $x_{n+1}$ to produce a prediction probability density on occurrence of the $x_{n+1}$, comprising a joint probability calculator structured by the Jeffreys mixture density probability calculator claimed in claim 4 for calculating a modified Jeffreys mixture density $q^{(\epsilon)}(x^n)$ and $q^{(\epsilon)}(x^{n+1})$ to produce first calculation results and a divider responsive to the calculation results for calculating a probability density $q^{(\epsilon)}(x^{n+1})/q^{(\epsilon)}(x^n)$ to produce a second calculation result with the first calculation results kept intact.

DESCRIPTION OF THE PREFERRED EMBODIMENTS

Figure 1:
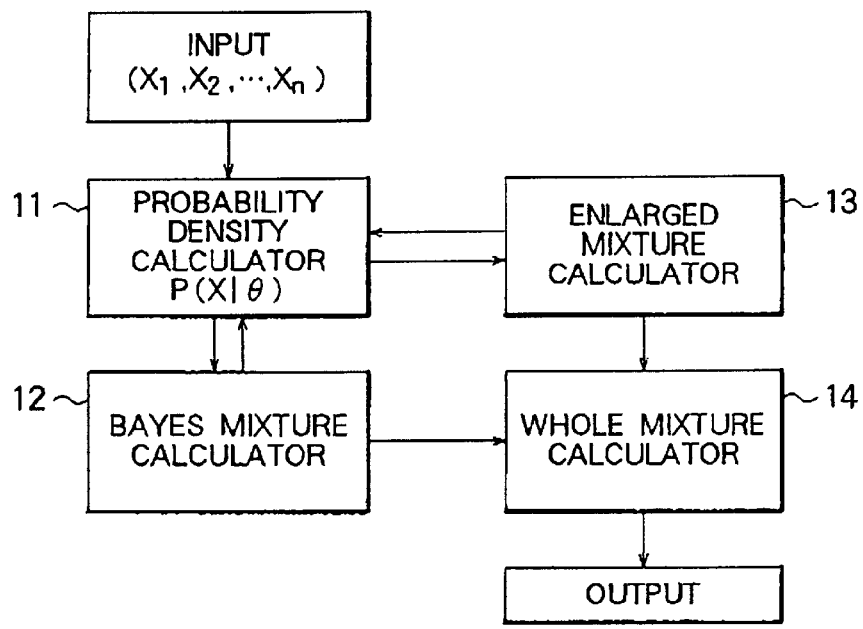
FIG. 1 shows a block diagram for use in describing a method according to a first embodiment of the invention, which is executed by the use of a first modified Bayes mixture distribution calculator.

First, explanation is made about symbols used in this specification. Let $\nu$ be $\sigma$-finite measure on the Borel subsets of k-dimensional euclidean space $\Re^k$ and $\chi$ be the support of $\nu$. For example, it is assumed that Lebesgue measure dx on the $\Re^d$ is $\nu(dx)$ and $\Re^k$ itself is $\chi$ (conversely, more general measure space could be assumed).

Herein, let consideration be made about a problem or a procedure which calculates, for each natural number t, a probability density of $x_{t+1}$ in response to a sequence $x^t$ and $x_{t+1}$. Here, $$\int_\chi q(x_{i+1}|x^i)v(dx_{i+1}) = 1$$

and $x_{t+1} \in \chi$. Such a procedure is assumed to be expressed as $q(x_{t+1}|x^t)$. This means that a probability density of $x_{t+1}$ is expressed on condition that $x^t$ are given. In this event, the following equation holds.

$$\int_\chi q(x_{t+1}|x^t)v(dx_{t+1})=1$$

In the above equation, $q(x_{t+1}|x^t)$ is referred to as prediction probability distribution for t+1-th data $x_{t+1}$.

Then, if $$(q(x^n))^{def} = \prod_{t=0}^{n-1} q(x_{t+1}|x^t)$$

(assuming that $q(x_1)$ is defined even if t=0), the following equation holds.

$$\int_{\chi^n} q(x^n)v(dx^n)=1$$

where, $$(v(dx^n))^{def} = \prod_{t=1}^n v(dx^t).$$

Therefore, q defines a joint probability distribution on infinite sequence set $\chi\infty$ (that is, q defines stochastic process). Giving a stochastic process q, a prediction procedure is determined.

Next, a model class is determined. Let $p(x|u)$ be a probability density of $x \in \chi$ based on a measure v, where u is a real-valued parameter of d-dimensional. Then, the model class is defined by;

$$s \stackrel{def}{=} \{p(\cdot|u) : u \in U\}$$

This class may be referred to as a hypothesis class. Where, let U be a subset of $\Re^d$. Assuming that $p(x|u)$ is differentiable twice for u. And when let K be compact set included in U, S(K) is given by:

$$S(K) \stackrel{def}{=} \{p(\cdot|u) : u \in K\}$$

Furthermore, definition is made as follows.

$$p(x^n|u) \stackrel{def}{=} \prod_{i=1}^n p(x_t|u)$$

That is, for a sequence of data $x^n$, assuming that each element $x_t$ independently follows the same distribution $p(\cdot|u)$ (each element is specified by i.i.d. which is an abbreviation of an independently identical distributed state). For simplicity, in the specification, such assumption is introduced. However, the method according to the invention may be easily expanded to the case where the each element $x_t$ is not i.i.d.

A prior distribution is defined as a probability distribution in which a parameter u is regarded as a random variable. It is presumed that density for Lebesgue measure du of a certain prior distribution is provided as w(n). Then, $p_w$ is considered as probability density on $\chi^n$, if it is given by:

$$p_w(x^n) \stackrel{def}{=} \int p(x^n|u)w(u)du$$

Thus obtained $p_w$ is referred to as Bayes mixture with prior density w.

Next, definition of Jeffreys prior distribution is recalled. Fisher information of parameter u is represented as J(u). That is, ij component of d-dimensional square matrix is obtained by following equation.

$$J_{ij}(u) = -E_u\left[\frac{\partial^2 \log p(x|u)}{\partial u_j \partial u_i}\right]$$

In the above equation, log denotes natural logarithm and $E_u$ represents expected value based on $p(x|u)$. A density on K for Lebesgue measure du of Jeffreys prior distribution is represented as $w_J(u)$, and obtained by:

$$w_J(u) = \frac{\sqrt{\det(J(u))}}{C_J(K)}$$

where $$C_J(K) \stackrel{def}{=} \int_K \sqrt{\det(J(u))}du, \text{ that is, } C_J(K)$$

is representative of a normalization constant.

Next, Jeffreys procedure proposed by B. Clarke and A. R. Barron will be explained. Their method responds to inputs $x^n$ and $x_{n+1}$ and produces outputs given by:

$$p_J(x_{n+1}|x^n) \stackrel{def}{=} \frac{\int_K p(x^{n+1}|u)w_K(u)du}{\int_K p(x^n|u)w_K(u)du}$$

Next, redundancy which is used as a performance measure which they employ is introduced. Let $q(x_t|x^{t-1})$ represent an output corresponding to an input $(x^{t-1},x_t)$ obtained a certain procedure q. Herein, it is assumed that each $x_t$ (t=1,2, . . . ,n+1) is a random variable following a certain $p(\cdot|u)$ ($u \in U_c \subset U$). Redundancy for u of q is determined by:

$$R_n(q, u) \stackrel{def}{=} \sum_{t=1}^n E_u\left[\log \frac{p(x_t|u)}{q(x_t|x^{t-1})}\right]$$

This may be referred to as cumulative Kullback-Leibler divergence. The value is always non-negative and means that the performance of q becomes more excellent as the value becomes small. In particular, this index is often used in the context of data compression. Also, it is noted that the redundancy may be rewritten as follows.

$$R_n(q, u) = E_u\left[\log \frac{p(x^t|u)}{q(x^n)}\right]$$

Optimality of Jeffreys procedure proposed by B. Clarke and A. R. Barron is realized when the following equation is true.

$$R_n(p_J, u) = \frac{d}{2}\log\frac{n}{2\pi e} + \log C_J(K) + o(1)$$

Herein, the value of o(1) nears zero as n increases in amount. This asymptotic equation uniformly holds for all u (u∈K0) when let $K_0$ be any compact set which included $K^o$ (i.e. $K_o \subset K^O$).

Because $$\sup_{u \in K} R_n(q, u)$$

is larger than or equal to the above value $R_n(p_J,u)$ whenever q takes any value, the asymptotic equation is optimum. That is, the following equation holds.

$$\inf_q \sup_{u \in K} R_n(q, u) = \frac{d}{2}\log\frac{n}{2\pi e} + \log C_J(K) + o(1)$$

For the above relationship, $p_J$ may be represented as asymptotically minimax for redundancy.

Next, logarithmic regret is introduced. It is assumed that a sequence of data $x^n$ is given. Logarithmic regret for the data $x^n$ of q with respect to probability model S is defined by following equation.

$$r(q, x^n) \stackrel{def}{=} \sum_{t=1}^{n} \log \frac{p(x_t|\hat{u}(n))}{q(x_t|x^{t-1})}$$

Where, û(n) is maximum likelihood estimation value of u on condition that the $x^n$ is given. That is, û(n) is defined as follows.

$$\hat{u}(n) \stackrel{def}{=} \arg \max_u p(x^n|u)$$

Like in the case of redundancy, the logarithmic regret is represented another way as follows.

$$r(q, x_n) = \log \frac{p(x^n|\hat{u}(n))}{q(x^n)}$$

In this point, when S is assumed to be an exponential family, following equation (1) holds.

$$r(p_J, x^n) = \frac{d}{2}\log\frac{n}{2\pi} + \log C_J(K) + o(1) \quad (1)$$

Exponential family is a model which can be represented by the following equation.

$$S = \{p(x|\theta) = \exp(\theta \cdot x - \psi(\theta)) : \theta \in \Theta\}$$

According to practice for notation of exponential family, θ may be used as parameter instead of u. θ is referred to as natural parameter or θ-coordinates in exponential family. More detail description is made in L. Brown, "Fundamentals of statistical exponential families", Institute of Statistics, 1986.

Asymptotic equation (1) uniformly holds for all $x^n$ which satisfies: $\hat{u}(n) \in K_0$. Like in the case of redundancy, if the following equation is true, q has property of minimax for logarithmic regret. However, when S does not belong to exponential family, the above asymptotic equation for Jeffreys procedure is not true. Instead, it can be proved that the following formula holds.

$$\sup_{x^n \hat{u}(n) \in K_0} r(p_J, x^n) > \inf_q \sup_{x^n \hat{u}(n) \in K} r(q, x^n)$$

Taking the above into consideration, some modifications are required. Here, one of solutions is explained. First, empirical Fisher information Ĵ is introduced and is given by:

$$\hat{J}(x|u) \stackrel{def}{=} -\frac{\partial^2 \log p(x|u)}{\partial u_j \partial u_i}$$

Furthermore, a definition is added as follows.

$$\hat{J}(x^n|u) \stackrel{def}{=} \frac{1}{n}\sum_{t=1}^{n} \hat{J}(x_t|u)$$

In this case, the following equation holds.

$$\hat{J}(x^n|u) = -\frac{1}{n}\partial^2 \log p(x^n|u \frac{)}{\partial u_j \partial u_i}$$

Using the definitions of J gives:

$$J(u) = E_u[\hat{J}(x^n|u)]$$

Next, a random variable s is defined by:

$$s(x|u) \stackrel{def}{=} \hat{J}(x|u) - J(u),$$

where s is representative of a d-dimensional square matrix. Like in the case of the definition of $\hat{J}(x^n|u)$, $s(x^n|u)$ is defined by:

$$s(x^n|u) = \frac{1}{n}\sum_{t=1}^{n} s(x_1|u)$$

Let v be representative of the d-dimensional square matrix. In this event, a family of new probability density is defined by:

$$\bar{p}(x|u, v) \stackrel{def}{=} p(x|u)\exp(v \cdot s(x|u) - \psi(u, v))$$

where $$v \cdot s(x|u) \stackrel{def}{=} \sum_{ij} v_{ij} s_{ij}(x|u)$$

and $$\psi(u, v) \stackrel{def}{=} \log \int p(x|u)\exp(v \cdot s(x|u))v(dx)$$

In this case, it is noted that $\bar{p}(x^n|u, v)$ is represented by:

$$\bar{p}(x^n|u,v) = p(x^n|u)\exp(n(v \cdot s(x^n|u) - \psi(u,v)))$$

Next, $$V_B \stackrel{def}{=} \{v : \forall\ i\ \forall\ j,\ |v_{ij}| \leq B\},$$

and S is expanded into $\bar{S}$ on the assumption that B is representative of a certain positive constant and $\psi(u, v)$ is finite for $u \in u$, $v \in V_B$.

$$\bar{S} = \{\bar{p}(\cdot|u, v) : u \in u, v \in V_B\}$$

$\bar{S}$ thus obtained by expansion of S is referred to as exponential fiber bundle for S. In this case, the meaning of adjective "exponential" indicates that $s(x|u)$ has the same direction as exponential curvature of S. More detail description is made in "Differential geometry in statistical inference", Institute of Mathematical Statistics, Chapter 1, 1987.

Let $\rho(u)$ be prior density on u and mixture density m be defined by:

$$m(x^n) \stackrel{def}{=} \int \bar{p}(x^n | y, v) \rho(u) du dv / (2B)^{d^2}$$

Herein, a range of integral for v is $V_B$. Also it is noted that $(2B)^{d^2}$ is Lebesgue volume of $V_B$.

Mixture is constructed by combining the following equation (2) with $p_J$.

$$q^{(\varepsilon)}(x^n) \stackrel{def}{=} (1 - \varepsilon_n) p_J(x^n) + \varepsilon_n \cdot m(x^n), \quad (2)$$

where $0 < \varepsilon_n < 1/2$. For q in the above equation, it is assumed that value of $\varepsilon_n$ is decreased according to an amount of n and the following inequality (3) holds.

$$\forall\ n,\ \varepsilon_n \geq \frac{1}{n^1} \quad (3)$$

In the formula (3), 1 is representative of a certain positive number. On the basis of these assumptions, it is proved that $q^{(\varepsilon)}$ asymptotically becomes minimax as the value of n increases.

This shows that, when $q(x_t|x^{t-1})$ is calculated not only by using the mixture for S like in the general Bayes procedure but also by slightly combining the mixture $m(x^n)$ for enlarged class, the calculation brings about a good result with respect to the logarithmic regret.

When S belongs to the model referred to as a curved exponential family, the procedure can be more simplified. This is specified by the case where S belongs to a smooth subspace of the exponential family T. More specifically, on the assumption that T is a $\bar{d}$-dimensional exponential family given by $(T = \{p(x|\theta) = \exp(\theta \cdot x - \psi(\theta)) : \theta \in \Theta \subset \Re^{\bar{d}}\})$ S is represented on the condition of $(d < \bar{d})$ by $$S = \{p_c(x|u) = p(x|\phi(u)) : u \in U \subset \Re^d\}$$

where $\phi$ is a smooth function characterized in that $u \mapsto \theta$. For example, if $\chi$ is a finite set, any smooth model becomes a curved exponential family. Although the curved exponential family has high generality in comparison with the exponential family, it is not generalized as compared with the general smooth model class. More detail description is made by Shunichi Amari in "Differential-geometrical methods in statistics", Lecture notes in Statistics, Springer-Verlag.

Under these circumstances, $\bar{S}$ (exponential fiber bundle of S) is coincident with T by the first-order approximation.

Therefore, mixture in exponential family T in which S is included can be used instead of the mixture in exponential fiber bundle. That is, it can be proved like in the above that $q^{(\varepsilon)}$ becomes minimax on the assumption given by:

$$m(x^n) = \int_{\Theta'} p(x^n|\theta) \rho(\theta) d\theta$$

In the above-equation, $\Theta'$ represents a set including $\{\Theta : \theta = \phi(u), u \in U\}$, $\rho$ represents a smooth prior distribution density on the $\Theta'$.

In addition, in the case of the curved exponential family, calculation of Fisher information J(u) becomes easy. That is, in this case, an expected value can be determined without any operation by the following equation (4).

$$J_{ij}(u) = \sum_{\alpha=1}^{\bar{d}} \sum_{\beta=1}^{\bar{d}} \frac{\partial \phi_\alpha(u)}{\partial u_i} \frac{\partial \phi_\beta(u)}{\partial u_j} \partial^2 \psi \frac{(\theta)}{\partial \theta_\alpha \partial \theta_\beta}\bigg|_{\theta = \phi(u)} \quad (4)$$

This is because the Fisher information of $\theta$ in the exponential family T is given by:

$$\frac{\partial^2 \psi(\theta)}{\partial \theta_\alpha \partial \theta_\beta}$$

In the previous description, it has thus far been explained that logarithmic regret which is used as the performance measure for sequential prediction issue can be minimized by combining the mixture on the exponential fiber bundle with the Bayes mixture. This is advantageous even if the logarithmic loss is used as the performance measure for non-sequential prediction issue. This is because suggestion is made about the fact that decreasing a value of the following formula concerned with the logarithmic loss results in a decrease of each term in the equation, namely, $\log(1/(q(x_t|x^{t-1})))$. The values of $\log(1/(q(x_t|x^{t-1})))$ are referred to as the logarithmic loss. Now, the formula in question is given by:

$$\sum_{t=1}^n \log \frac{p(x_t|\hat{u}(n))}{q(x_t|x^{t-1})}$$

It is an object of the present invention to provide a statistical estimation method which is improved by using the above described techniques.

Herein, description will be schematically made about first through eighth embodiments according to the present invention so as to facilitate understanding of the present invention.

In the first embodiment according to the present invention, calculation is carried out in connection with the modified Bayes mixture probability density. To this end, an output generated from a device which determines the Bayes mixture probability density on S is combined with an output generated from a device which calculates the Bayes mixture probability density on the exponential fiber bundle.

The second embodiment according to the present invention which is basically similar to the first embodiment is featured by using the Jeffreys prior distribution on calculating the Bayes mixture probability density on S.

The third embodiment according to the present invention is operable in a manner similar to the first embodiment except that operation is simplified when S is curved exponential family. Such simplification can be accomplished by utilizing the property of S.

The fourth embodiment according to the present invention which is basically similar to the third embodiment is featured by using the Jeffreys prior distribution in the device which determines the Bayes mixture probability density on S.

The fifth through the eighth embodiments according to the present invention are featured by calculating prediction probability density by the use of the devices according to the first through the fourth embodiments according to the invention, respectively.

Next, description will be made in detail about the first through the eighth embodiments according to the present invention with reference to the accompanying drawings.

Referring to FIG. 1, a device according to the first embodiment of the invention is operated in a following order or sequence.

(1) Inputs $x^n$ are provided to and stored into a probability density calculator shown by the block 11 in FIG. 1.

(2) Next, a Bayes mixture calculator shown by the block 12 in FIG. 1 calculates $p(x^n|u)$ for various values of u by the use of the probability density calculator 11 and also calculates approximation values of the Bayes mixture (given by $p_w(x^n)=\int p(x^n|u)w(u)du$) by using the previous calculation results $p(x^n|u)$. Thereafter, the Bayes mixture calculator 12 sends the approximation values to a whole mixture calculator shown by the block 14 in FIG. 1.

(3) An enlarged mixture calculator shown by the block 13 in FIG. 1 calculates $p(x^n|u)$ for various values of u and $p(x|u)$ for various values of both x and u in cooperation with the probability density calculator and calculates $J(u)$ and $\hat{J}(x^n|u)$ for various values of u by the use of previous calculation results $p(x^n|u)$ and $p(x|u)$. Further, using these results, the enlarged mixture calculator 13 calculates $\bar{p}(x^n|u, v)$ for various values of v and u, and calculates approximation values of Bayes mixture $m(x^n)=\int \bar{p}(x^n|u, v\rho(u)dudv/B^{d^2}$ by the use of the previous calculation results $\bar{p}(x^n|u, v)$ and sends the approximation values to the whole mixture calculator 14.

(4) The whole mixture calculator 14 calculates the mixture $q^{(\epsilon)}(x^n)=(1-\epsilon)p_w(x^n)+\epsilon \cdot m(x^n)$ for a predetermined small value of $\epsilon$ on the basis of the values of two Bayes mixtures which have been stored and produces the mixture as an output.

Figure 2:
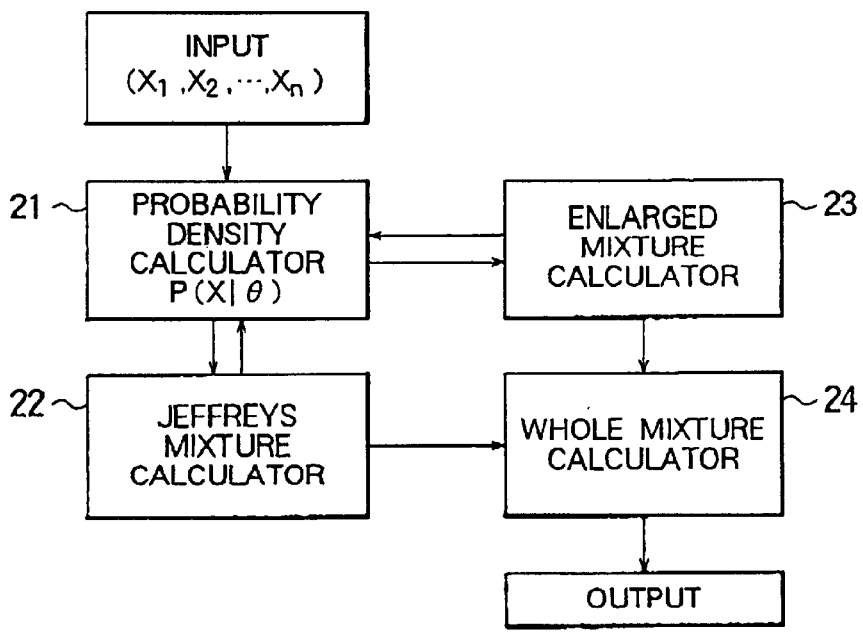
FIG. 2 shows a block diagram for use in describing a method according to a second embodiment of the invention, which is executed by the use of a first modified Jeffreys mixture distribution calculator.

Referring to FIG. 2, a device according to the second embodiment of the invention is basically similar in structure to the first embodiment of the invention except that the device illustrated in FIG. 2 utilizes a Jeffreys mixture calculator 22 instead of the Bayes mixture calculator 12 used in FIG. 1. In FIG. 2, the device carries out no calculation of the Bayes mixture $\int p(x^n|u)w(u)du$ but calculation of the Jeffreys mixture given by $\int p(x^n|u)w_J(u)du$ in accordance with the above operation (2). That is, the Jeffreys mixture calculator 22 calculates $p(x^n|u)$ for various values of u and $p(x|u)$ for various values of x and u in cooperation with the probability density calculator 21 and calculates $J(u)$ for various values of u by using previous calculation results $p(x^n|u)$ and $p(x|u)$. Subsequently, the Jeffreys mixture calculator 22 further calculates $w_J(u)$ for various values of u by the use of the previous calculation results to obtain approximation values of $\int p(x^n|u)w_J(u)du$ using $w_J(u)$.

Figure 3:
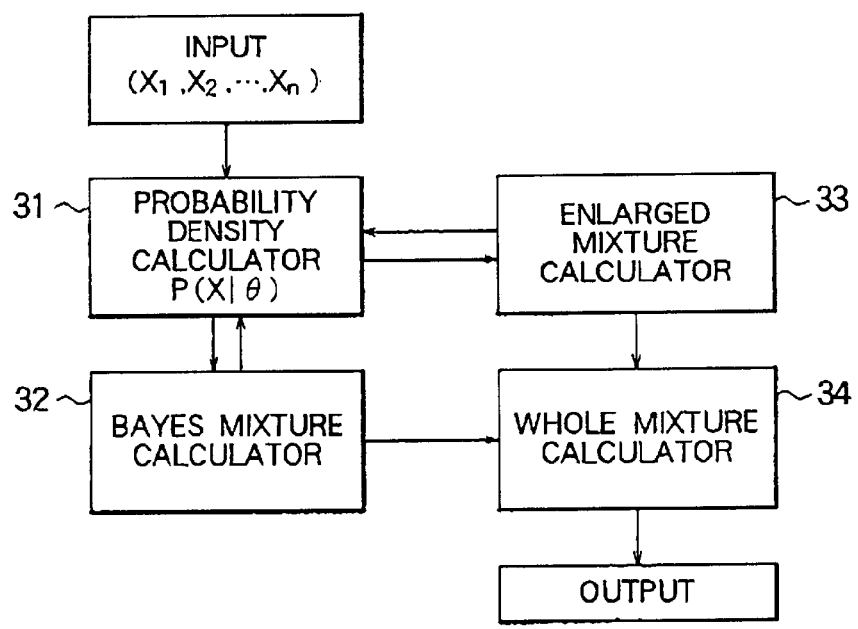
FIG. 3 shows a block diagram for use in describing a method according to a third embodiment of the invention, which is executed by the use of a second modified Bayes mixture distribution calculator.

Referring to FIG. 3, a device according to the third embodiment of the invention is successively operated in order mentioned below.

(1) Inputs $x^n$ are provided to and stored into probability density calculator shown by 31 in FIG. 3.

(2) A Bayes mixture calculator shown by 32 in FIG. 3 calculates $p_c(x^n|u)$ for various values of u in cooperation with the probability density calculator 31 and thereafter calculates approximation values of Bayes mixture $p_w(x^n)=\int p_c(x^n|u)w(u)du$ by using previous calculation results $p_c(x^n|u)$. As a result, the approximation values are sent from the Bayes mixture calculator 32 to a storage 34 which is operable as a part of a whole mixture calculator.

(3) An enlarged mixture calculator 33 in FIG. 3 calculates $p(x^n|\theta)$ for various values of $\theta$ in cooperation with the probability density calculator 31 and calculates approximation values of Bayes mixture $m(x^n)=\int_\Theta p(x^n|\theta)\rho(\theta)d\theta$ by using the previous calculation results. The approximation values are sent from the enlarged mixture calculator 33 to the whole mixture calculator 34 in FIG. 3.

(4) The whole mixture calculator 34 calculates mixtures $q^{(\epsilon)}(x^n)=(1-\epsilon)p_w(x^n)+\epsilon \cdot m(x^n)$ for a predetermined small value of $\epsilon$ on the basis of the values of two Bayes mixtures which have been stored and produces the mixtures as outputs.

Figure 4:
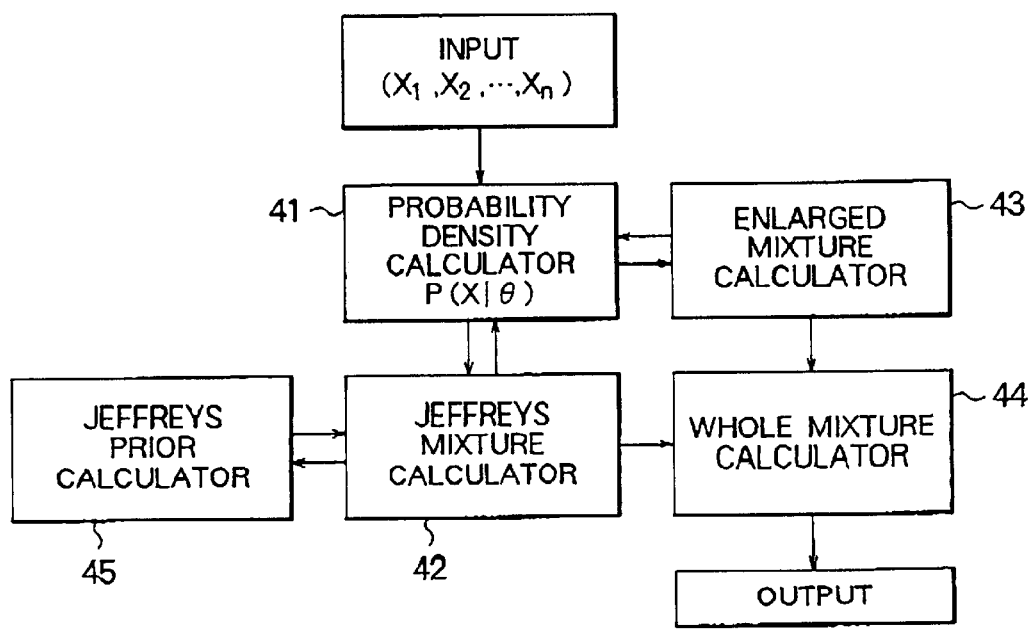
FIG. 4 shows a block diagram for use in describing a method according to a fourth embodiment of the invention, which is executed by the use of a second modified Jeffreys mixture distribution calculator.

Referring to FIG. 4, a device according to the fourth embodiment of the invention is successively operated in order.

(1) Inputs $x^n$ are provided to and stored into a probability density calculator shown by a block 41 in FIG. 4.

(2) A Jeffreys mixture calculator shown by 42 in FIG. 4 calculates $p_c(x^n|u)$ and $w_J(u)$ for various values of u in cooperation with the probability density calculator 41 and a Jeffreys prior distribution calculator 45 (which is designed according to the equation (4)). In addition, the Jeffreys mixture calculator 42 calculates approximation values of Jeffreys mixture $p_J(x^n)=\int p_c(x^n|u)w_J(u)du$ by using the previous calculation results $p_c(x^n|u)$ and $w_J(u)$, and sends the approximation values to a whole mixture calculator 44 in FIG. 4.

(3) An enlarged mixture calculator shown by 43 in FIG. 4 calculates $p(x^n|\theta)$ for various values of $\theta$ in cooperation with the probability density calculator 41 and obtain approximation values of Bayes mixture $m(x^n)=\int_\Theta p(x^n|\theta)\rho(\theta)d\theta$ by using the previous calculation results. The approximation values are sent from the enlarged mixture calculator 43 to the whole mixture calculator 44.

(4) The whole mixture calculator 44 calculates mixtures $q^{(\epsilon)}(x^n)=(1-\epsilon)p_J(x^n)+\epsilon \cdot m(x^n)$ for a predetermined small value of $\epsilon$ on the basis of the values of two Bayes mixtures which have been stored and produces the mixtures as outputs.

Figure 5:
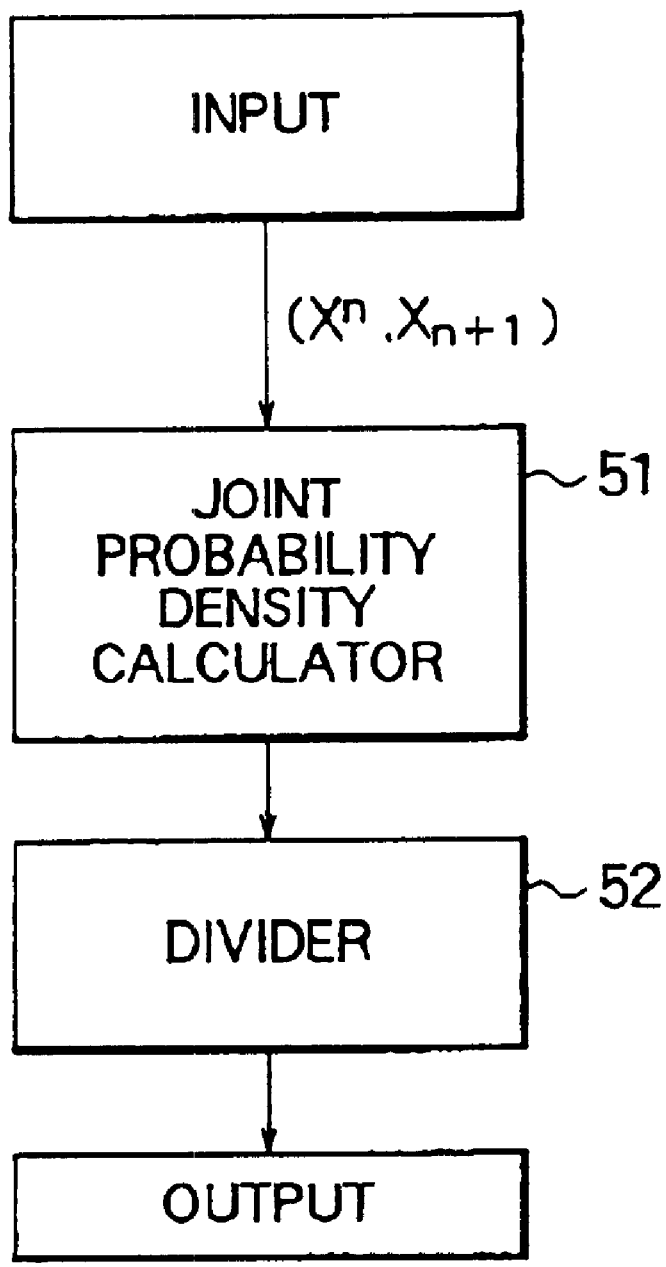
FIG. 5 shows a prediction probability calculator used in a method according to fifth through eighth embodiments of the invention.

Referring to FIG. 5, a device according to each of the fifth through eighth embodiments of the invention includes a joint probability density calculator 51. Herein, it is to be noted that the devices illustrated in FIGS. 1 through 4 may be incorporated as the joint probability density calculators 51 to the devices according to the fifth through the eighth embodiments of the present invention, respectively. The device shown in FIG. 5 is operated in order mentioned below.

(1) Inputs $x^n$ and $x_{n+1}$ are provided to the joint probability density calculator 51 in FIG. 5.

(2) The joint probability density calculator 51 calculates $q(x^n)$ and $q(x^{n+1})$ and sends the calculation results to a divider 52 in FIG. 5.

(3) The divider calculates $q(x_{n+1}|x^n)=q(x^{n+1})/q(x^n)$ by using the two joint probabilities sent from the joint probability density calculator 51.

According to the first embodiment of the invention, in regard to an issue of minimizing logarithmic regret for general probability model S, it is possible to calculate more advantageous joint probability distribution as compared with the conventional methods using traditional Bayes mixture joint probability on the S.

Furthermore, according to the second embodiment of the invention, in regard to an issue of minimizing logarithmic regret for general probability model S, it is possible to calculate more advantageous joint probability distribution as compared with the methods using traditional Jeffreys mixture joint probability on the S.

Moreover, the third embodiment of the invention is advantageous in regard to an issue of minimizing logarithmic regret for curved exponential family S in that the joint probability distribution is effectively calculated as compared with the methods using traditional Bayes mixture joint probability on the S.

In addition, the fourth embodiment of the invention is effective in connection with an issue of minimizing logarithmic regret for curved exponential family S in that it is possible to calculate more advantageous joint probability distribution as compared with the conventional methods using traditional Jeffreys mixture joint probability on the S.

Further, each of the fifth through the eighth embodiments of the invention can effectively calculate the prediction probability distribution in regard to a prediction issue using logarithmic loss as performance measure, as compared with the conventional methods. More specifically, the fifth embodiment is more convenient than the conventional methods using traditional Bayes mixture joint probability on probability model S while the sixth embodiment is effective as compared with the conventional methods using traditional Jeffreys mixture joint probability on probability model S. Likewise, the seventh embodiment of the invention is favorable in comparison with the conventional methods using traditional Bayes mixture joint probability on curved exponential family S while the eighth embodiment of the invention is superior to the conventional methods using traditional Jeffreys mixture joint probability on curved exponential family S.

What is claimed is:

1. A Bayes mixture density calculator operable in response to a sequence of vectors $x^n=(x_1, x_2, \ldots, x_n)$ selected from a vector value set $x$ to produce a Bayes mixture density on occurrence of the $x^n$, comprising:

a probability density calculator, supplied with a sequence of data $x^t$ and a vector value parameter u, for calculating a probability density for the $x^t$, $p(x^t|u)$;

a Bayes mixture calculator for calculating a first approximation value of a Bayes mixture density $p_w(x^n)$ on the basis of a prior distribution w(u) predetermined by the probability density calculator to produce the first approximation value;

an enlarged mixture calculator for calculating a second approximation value of a Bayes mixture $m(x^n)$ on exponential fiber bundle in cooperation with the probability density calculator to produce the second approximation value; and a whole mixture calculator for calculating $(1-e) p_w(x^n) + e \cdot m(x^n)$ to produce a calculation result by mixing the first approximation value of the Bayes mixture density $p_w(x^n)$ with a part of the second approximation value of the Bayes mixture $m(x^n)$ at a rate of 1−e:e to produce the calculation result where e is a value smaller than unity, said Bayes mixture density calculator including a device for applying said calculation result to perform data compression using arithmetic coding.

2. A Jeffreys mixture density calculator operable in response to a sequence of vectors $x^n=(x_1, x_2, \ldots, x_n)$ selected from a vector value set x to produce a Bayes mixture density on occurrence of the $x^n$, comprising:

a probability density calculator, supplied with a sequence of data $x^t$ and a vector value parameter u, for calculating a probability density for the $x^t$, $p(x^t|u)$;

a Jeffreys mixture calculator for calculating a first approximation value of a Bayes mixture density $p_J(x^n)$ on the basis of a prior distribution $w_J(u)$ predetermined by the probability density calculator to produce the first approximation value;

an enlarged mixture calculator for calculating a second approximation value of a Bayes mixture $m(x^n)$ on exponential fiber bundle in cooperation with the probability density calculator to produce the second approximation value; and a whole mixture calculator for calculating $(1-e) p_J(x^n) + e \cdot m(x^n)$ to produce a calculation result by mixing the first approximation value of the Bayes mixture density $p_J(x^n)$ with a part of the second approximation value of the Bayes mixture $m(x^n)$ at a rate of 1−e:e to produce the calculation result where e is a value smaller than unity, said Jeffreys mixture density calculator including a device for applying said calculation result to perform data compression using arithmetic coding.

3. A prediction probability density calculator operable in response to a sequence of vector $x^n=(x_1, x_2, \ldots, x_n)$ selected from a vector value set $\chi$ and $x_{n+1}$ to produce a prediction probability density on occurrence of the $x_{n+1}$ comprising:

a joint probability calculator structured by the Bayes mixture density calculator claimed in claim 1 for calculating a modified Bayes mixture density $q^{(e)(x^n)}$ and $q^{(e)}(x^{n+1})$ based on predetermined prior distribution to produce first calculation results; and a divider responsive to the calculation results for calculating probability density $^{(e)}(x^{n+1})/q^{(e)}(x^n)$ to produce a second calculation result with the first calculation results kept intact.

4. A prediction probability density calculator operable in response to a sequence of vector $x^n=(x_1, x_2, \ldots, x_n)$ selected from a vector value set $\chi$ and $x_{n+1}$ to produce a prediction probability density on occurrence of the $x_{n+1}$, comprising:

a joint probability calculator structured by the Jeffreys mixture density calculator claimed in claim 2 for calculating a modified Jeffreys mixture density $q^{(e)}(x^n)$ and $q^{(e)}(x^{n+1})$ to produce first calculation results; and a divider response to the calculation results for calculating a probability density $q^{(e)}(x^{n-1})/q^{(e)}(x^n)$ to produce a second calculation result with the first calculation results kept intact.

5. A Bayes mixture density calculating means for operation in response to a sequence of vectors $x^n=(x_1, x_2, \ldots, x_n)$ selected from a vector value set $\chi$ to produce a Bayes mixture density on occurrence of the $x^n$, comprising:

a probability density calculating means, supplied with a sequence of data $x^t$ and a vector value parameter u, for calculating a probability density for the $x^t$, $p(x^t|u)$;

a Bayes mixture calculating means for calculating a first approximation value of a Bayes mixture density $p_w(x^n)$ on the basis of a prior distribution w(u) predetermined by the probability density calculating means to produce the first approximation value;

an enlarged mixture calculating means for calculating a second approximation value of a Bayes mixture $m(x^n)$ on exponential fiber bundle in cooperation with the probability density calculating means to produce the second approximation value; and a whole mixture calculating means for calculating $(1-\epsilon) p_w(x_n) + \epsilon \cdot m(x^n)$ to produce a calculation result by mixing the first approximation value of the Bayes mixture density $p_w(x^n)$ with a part of the second approximation value of the Bayes mixture $m(x^n)$ at a rate of $1-\epsilon:\epsilon$ to produce the calculation result where $\epsilon$ is a value smaller than unity, said Bayes mixture density calculating means including means for applying said calculation result to perform data compression using arithmetic coding.

6. A prediction probability density calculating means operable in response to a sequence of vector $x^n=(x_1, x_2, \ldots, x_n)$ selected from a vector value set $\chi$ and $x_{n+1}$ to produce a prediction probability density on occurrence of the $x_{n+1}$, comprising:

a joint probability calculating means structured by the Bayes mixture density calculating means claimed in claim 5 for calculating a modified Bayes mixture density $q^{(\epsilon)}(x^n)$ and $q^{(\epsilon)}(x^{n+1})$ based on predetermined prior distribution to produce first calculation results; and a divider responsive to the calculation results for calculating probability density $q^{(\epsilon)}(x^{n+1})/q^{(\epsilon)}(x^n)$ to produce a second calculation result with the first calculation results kept intact.

7. A Jeffreys mixture density calculating means for operation in response to a sequence of vector $x^n=(x_1, x^2, \ldots, x^n)$ selected from a vector value set $\chi$ to produce a Bayes mixture density on occurrence of the $x^n$, comprising:

a probability density calculating means responsive to a sequence of data $x^t$ and a vector value parameter u for calculating a probability density $p(x^t|u)$ for the $x^t$;

a Jeffreys mixture calculating means for calculating a first approximation value of a Bayes mixture density $p_J(x^n)$ based on a Jeffreys prior distribution $w_J(u)$ in cooperation with the probability density calculating means to produce the first approximation value;

an enlarged mixture calculating means for calculating a second approximation value of a Bayes mixture $m(x^n)$ on exponential fiber bundle in cooperation with the probability density calculating means to produce the second approximation value; and a whole mixture calculating means for calculating $(1-\epsilon)p_w(x^n)+\epsilon \cdot m(x^n)$ to produce a calculation result by mixing the first approximation value of the Bayes mixture density $p_J(x^n)$ with a part of the second approximation value of the Bayes mixture $m(x^n)$ at a rate of $1-\epsilon:\epsilon$ to produce the calculation result where $\epsilon$ is a value smaller than unity, said Jeffreys mixture density calculating means including means for applying said calculation result to perform data compression using arithmetic coding.

8. A prediction probability density calculating means operable in response to a sequence of vector $x^n=(x_1, x_2, \ldots, x_n)$ selected from a vector value set $\chi$ and $x_{+1}$ to produce a prediction probability density on occurrence of the $x_{n+1}$, comprising:

a joint probability calculating means structured by the Jeffreys mixture density calculating means claimed in claim 7 for calculating a modified Jeffreys mixture density $q^{(\epsilon)}(x^n)$ and $q^{(\epsilon)}(x^{n+1})$ to produce first calculation results; and a dividing means, responsive to the calculation results for calculating a probability density $q^{(\epsilon)}(x^{n+1})/q^{(\epsilon)}(x^n)$ to produce a second calculation result with the first calculation results kept intact.

9. A Bayes mixture density calculator, comprising:

a probability density calculator having an input that includes a sequence of vectors $x^n=(x_1, x_2, \ldots, x_n)$ selected from a vector value set $\chi$ to produce a Bayes mixture density on occurrence of the $x^n$, supplied with a sequence of data $x^t$ and a vector value parameter u, that calculates a probability density for the $x^t$, $p(x^t|u)$, and a first output;

a Bayes mixture calculator that is coupled to the first output and generates a first approximation value of a Bayes mixture density $p_w(x^n)$ on the basis of a prior distribution $w(u)$ predetermined by the probability density calculator to produce the first approximation value as a second output;

an enlarged mixture calculator having an input that receives the first output from the probability density calculator to calculate a second approximation value of a Bayes mixture $m(x^n)$ on exponential fiber bundle and produce the second approximation value; and a whole mixture calculator that mixes the first approximation value, received from the Bayes mixture calculator, of the Bayes mixture density $p_w(x^n)$ with a part of the second approximation value received from the enlarged mixture calculator, of the Bayes mixture $m(x^n)$ at a rate of $1-\epsilon:\epsilon$ to generate $(1-\epsilon)p_w(x^n)+\epsilon \cdot m(x^n)$ and produce the calculation result where $\epsilon$ is a value smaller than unity, said Bayes mixture density calculator including a device for applying said calculation result to perform data compression using arithmetic coding.

10. A prediction probability density calculator operable in response to a sequence of vector $x^n=(x_1, x_2, \ldots, _n)$ selected from a vector value set $\chi$ and $x_{n+1}$ to produce a prediction probability density on occurrence of the $x_{n+1}$, comprising:

a joint probability calculator that is structured by the Bayes mixture density calculator of claim 9 and calculates a modified Bayes mixture density $q^{(\epsilon)}(x^n)$ and $q^{(\epsilon)}(x^{n+1})$ based on an input that comprises a predetermined prior distribution to produce first calculation results at a first output; and a divider, coupled to the joint probability calculator and responsive to the calculation results at said output that generates probability density $q^{(\epsilon)}(x^{n+1})/q^{(\epsilon)}(x^{n+1})$ to produce a second calculation result at a second output, with the first calculation results kept intact.

11. A Jeffreys mixture density calculator, comprising:

a probability density calculator having an input that includes a sequence of vector $x^n=(x_1, x_2, \ldots, x_n)$ selected from a vector value set $\chi$ to produce a Bayes mixture density on occurrence of the $x^n$, responsive to a sequence of data $x^t$ and a vector value parameter u that calculates a probability density $p(x^t|u)$ for the $x^t$ at a first output and a second output;

a Jeffreys mixture calculator that calculates a first approximation value of a Bayes mixture density $p_J(x^n)$ based on a Jeffreys prior distribution $w_J(u)$ in cooperation with the input and first output of the probability density calculator to produce the first approximation value;

an enlarged mixture calculator that calculates a second approximation value of a Bayes mixture $m(x^n)$ on exponential fiber bundle in cooperation with the second output of the probability density calculator to output the second approximation value; and a whole mixture calculator that calculates $(1-\epsilon)p_w(x^n)+\epsilon \cdot m(x^n)$ to produce a calculation result by mixing the first approximation value, from an output of the Jeffreys mixture calculator, of the Bayes mixture density $p_J(x^n)$ with a part of the second approximation value, output by the enlarged mixture calculator, of the Bayes mixture $m(x^n)$ at a rate of $1-\epsilon:\epsilon$ to produce the calculation result wherein $\epsilon$ is a value smaller than unity, said Jeffreys mixture density calculator including a device for applying said calculation result to perform data compression using arithmetic coding.

12. A prediction probability density calculator operable in response to a sequence of vector $x^n=(x_1, x_2, \ldots, x_n)$ selected from a vector value set $\chi$ and $x_{n+1}$ to produce a prediction probability density on occurrence of the $x_{n+1}$, comprising:

a joint probability calculator structured by the Jeffreys mixture density calculator of claim 11 that calculates a modified Jeffreys mixture density $q^{(\epsilon)}(x^n)$ and $q^{(\epsilon)}(x^{n+1})$ to produce first calculation results; and a divider, responsive to the calculation results, that calculates a probability density $q^{(\epsilon)}(x^{n+1})/q^{(\epsilon)}(x^n)$ to produce a second calculation result with the first calculation results kept intact.

* * * * *